(12) United States Patent
Shah

(10) Patent No.: US 8,892,910 B2
(45) Date of Patent: Nov. 18, 2014

(54) METHOD AND SYSTEM FOR PROVIDING DYNAMIC POWER SHARING TO NETWORK DEVICES

(75) Inventor: Rupal Bhavin Shah, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1169 days.

(21) Appl. No.: 12/316,819

(22) Filed: Dec. 17, 2008

(65) Prior Publication Data

US 2010/0153750 A1 Jun. 17, 2010

(51) Int. Cl.
- *G06F 1/26* (2006.01)
- *G06F 1/32* (2006.01)
- *H04L 12/10* (2006.01)
- *H04L 12/40* (2006.01)

(52) U.S. Cl.
CPC .......... *H04L 12/40045* (2013.01); *H04L 12/10* (2013.01)
USPC ........... 713/300; 713/323; 713/324; 713/330; 709/252

(58) Field of Classification Search
CPC ......... G06F 1/26; G06F 1/266; G06F 1/3203; G06F 1/3209; G06F 1/3215; H04L 12/12; H04L 12/44; H04L 41/0833
USPC .................. 713/300, 323, 324, 330; 709/252
See application file for complete search history.

(56) References Cited

U.S. PATENT DOCUMENTS

| | | | |
|---|---|---|---|
| 6,720,589 B1 * | 4/2004 | Shields .......................... | 257/194 |
| 7,886,165 B2 * | 2/2011 | Khan et al. .................... | 713/300 |
| 2004/0187042 A1 * | 9/2004 | Kawanabe .................... | 713/300 |
| 2006/0041767 A1 * | 2/2006 | Maxwell et al. .............. | 713/323 |
| 2006/0089230 A1 | 4/2006 | Biederman et al. | |
| 2007/0011547 A1 | 1/2007 | Karam | |
| 2007/0025452 A1 | 2/2007 | Schindler | |
| 2007/0041568 A1 | 2/2007 | Ghoshal et al. | |
| 2007/0288784 A1 * | 12/2007 | Koper et al. .................. | 713/324 |

* cited by examiner

*Primary Examiner* — Michael J Brown

(57) ABSTRACT

Embodiments include a network switch for use in a local area network that interconnects the switch and one or more network powered devices, the switch also being operatively connected to at least one power supply that powers the switch, the switch comprising a plurality of ports to which network powered devices are connected, at least one management module for controlling the operation of the switch, the module having memory for storing information relating to the power and operating requirements of each connected network device, and a processor for controlling the distribution of power from the power supply among the ports, including selectively time slicing power provided to at least selected ones of the ports.

19 Claims, 2 Drawing Sheets

FIG. 2

| CLASS | USAGE | MINIMUM POWER LEVELS AT OUTPUT OF PSE |
|---|---|---|
| 0 | DEFAULT | 15.4 WATTS |
| 1 | OPTIONAL | 4.0 WATTS |
| 2 | OPTIONAL | 7.0 WATTS |
| 3 | OPTIONAL | 15.4 WATTS |
| 4 | RESERVED (FUTURE USE) | TREAT AS CLASS 0 |

TABLE 1 POWER CLASSIFICATIONS PSE

FIG. 3

| CLASS | USAGE | RANGE OF MAXIMUM POWER USED BY THE PD |
|---|---|---|
| 0 | DEFAULT | 0.44 - 12.95 WATTS |
| 1 | OPTIONAL | 0.44 - 3.84 WATTS |
| 2 | OPTIONAL | 3.84 - 6.49 WATTS |
| 3 | OPTIONAL | 6.49 - 12.95 WATTS |
| 4 | NOT ALLOWED | RESERVED (FUTURE USE) |

TABLE 2 POWER CLASSIFICATION PD

METHOD AND SYSTEM FOR PROVIDING DYNAMIC POWER SHARING TO NETWORK DEVICES

BACKGROUND OF THE INVENTION

The present invention relates to computer networking generally and more specifically to a technique for applying power to a local area network (LAN) device where the power is supplied over the network cable.

The IEEE Standards Association (IEEE-SA) has developed specifications for supplying DC power to network devices over the physical networking cables, as described in the draft IEEE standard P802.3af specifications. This is generally referred to as the Power over Ethernet (PoE) specification. Generally such cables are known as Category 5 cabling and provide network communication links and also DC power to Ethernet data terminals connected to the network. Since this technology enables the powered devices, to receive their operating power over the same Ethernet LAN connection used for data communication, there is no need for each powered device to be connected to an auxiliary AC power socket or an AC/DC power converter.

The technology described in the P802.3af specification is also being updated in a P802.3at specification that is expected to increase the power that can be supplied on each port to a maximum value that is nearly double the initial amount or more than the maximum of 15.6 watts per port, although the maximum value has not yet been determined.

A Power over LAN system comprises an Ethernet switch and a power hub, which serves as the DC power source, along with a number of powered device terminals, which communicate via the switch and draw power from the hub. The system is typically connected in a star topology, with each terminal being linked by a cable to the switch and hub. The power hub in one chassis may be integrated with the switch in a second chassis, in a console containing both chassis, in what is known as an "end-span" configuration. Alternatively, the-power hub chassis may be located between the switch chassis and the terminals, in a "mid-span" configuration. DC power is carried to the loads (i.e., the terminals) over twisted pairs provided by Category 5 cabling. The end-span configuration uses twisted-data-pairs that are also used for Ethernet communication; the mid-span configuration uses spare twisted-spare-pairs that are not used for Ethernet communication.

DESCRIPTION OF THE DRAWINGS

FIG. 2 is a table identifying power classifications for power sourcing equipment (PSE) devices;

FIG. 3 Three is another table showing the power classification for powered devices in a PoE system.

DETAILED DESCRIPTION

Figure 1:
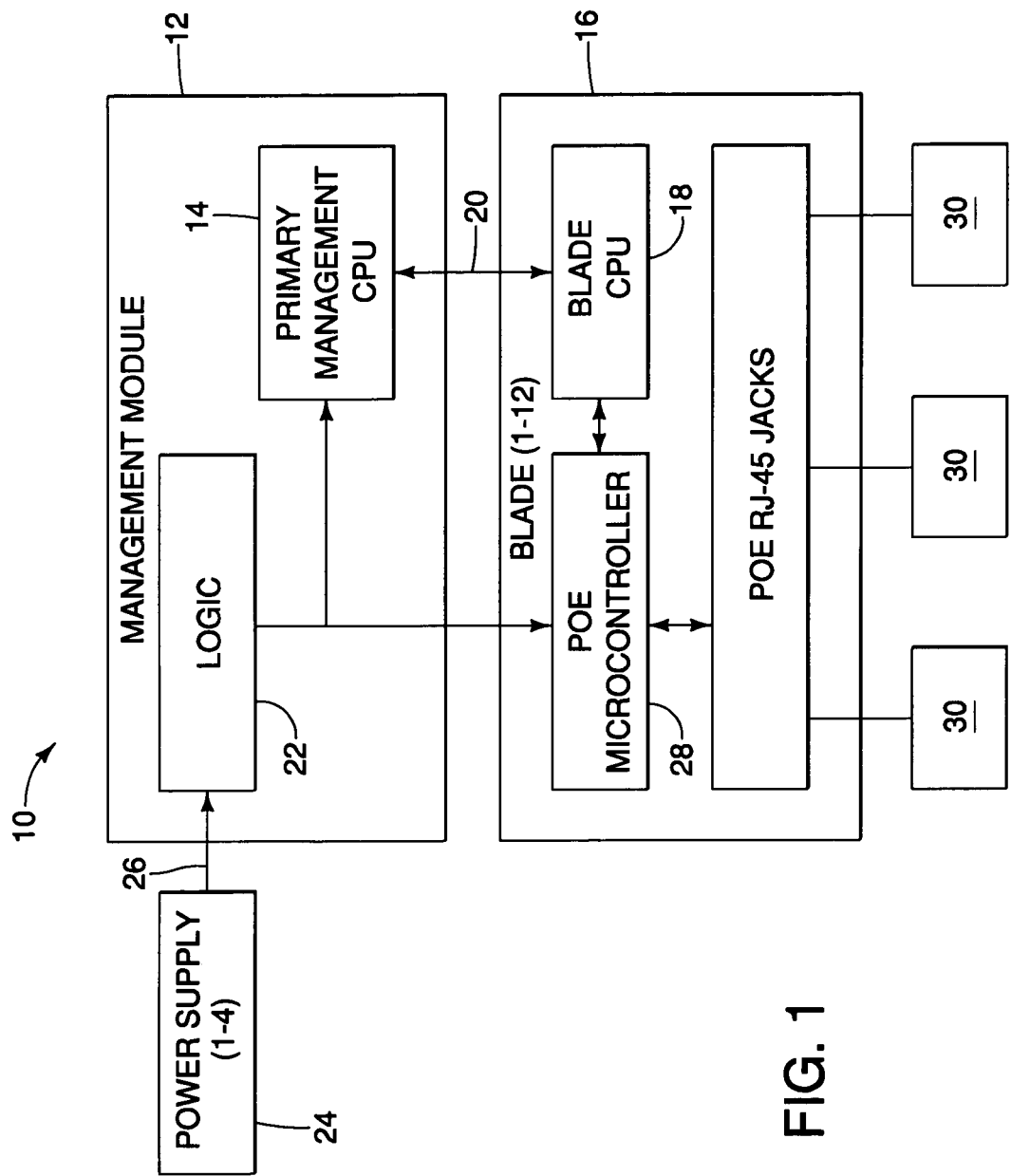
FIG. 1 is a block diagram of a system supporting PoE on a stackable switch.

Embodiments of the present invention enable a Power over Ethernet network switch to operate more efficiently and enable a specific switch to power a larger number of powered devices in a more efficient manner using a fewer number of power supplies than would otherwise be required. This is achieved by having a dynamic PoE power sharing feature on the switches that support PoE ports. The power sharing feature enables more powered devices to be powered by the switch because they take into consideration the capability of certain types of powered devices to have a limited amount of downtime during operation or they are devices which have an internal battery which can be intermittently recharged by effectively time slicing power produced by the PoE power supplies during operation. The powered devices may comprise access points, IP telephones, or IP cameras. Access points and cameras often have internal batteries.

Turning now to the drawings and particularly FIG. 1, a system diagram is shown which supports PoE and has a stackable switch, indicated generally at 10, which includes a management module 12 and a primary management CPU 14. Switch 10 preferably has a number of blade switch modules 16, each of which has a blade CPU 18 that is interconnected with the primary management CPU 14 by connection 20. The management module 12 has internal logic 22 that is connected to one or more power supplies 24 through lines 26. Logic 22 provides power to the blade switch modules 16 that also have a PoE microcontroller 28 that provides power to the PoE RJ-45 jacks to which a plurality of powered devices are connected.

It should be understood that the system block diagram shown in FIG. 1 is for a blade switch, and that other embodiments of the present invention may be suited for a stackable switch, in which case the primary management CPU 14 and the blade CPU 18 would be the same entity, since there are no blades on a stackable switch. This time slicing functionality can be provided in the chassis for routers or switches powered by an external power supply.

As is shown in FIG. 2, the power classifications for PSE devices is shown as classes 0 through 4 with class 0 having a default minimum power level at the output of the PSE of 15.4 Watts; class 1 having a minimum power level of 4.0 Watts; class 2 having a minimum power level of 7.0 Watts; class 3 having a minimum power level of 15.4 Watts and class 4 being reserved for future use.

Similarly, FIG. 3 shows a table of classifications showing the range of maximum power used by the powered devices wherein the class 0 default has a maximum power usage level of 0.44 to 12.95 Watts, class 1 has a range of maximum power usage of 0.44 to 3.84 Watts, class 2 has a range of maximum power usage of 3.84 to 6.49 Watts, class 3 has a maximum power range of 6.49 to 12.95 Watts and class 4 is reserved for future use.

Embodiments of the present invention provide dynamic power sharing for one or more selected switches or selected jacks of such switches. For high priority powered devices that must have uninterrupted power applied to them, those jacks would not be configured for time slicing of power provided to them. With dynamic power sharing provided on many of the jacks, a greater number of devices that can be supported by a given power supply as compared to providing fixed power to a fixed number of ports or jacks.

As a general consideration, it is highly desirable if not necessary to power on critical devices first, and it is standard practice to rank devices as either critical, high, or low priority. The employment of time slicing should be consistent with this practice. Such priority categorization is input into the power management software by the user. The frequency of time slicing can be varied on a port by port basis The powered devices that are connected to the dynamic power sharing ports have either an internal battery or some predetermined allowed downtime. For devices in the later category, it is necessary that they can return to full operation within some necessary restart time period, e.g., a few seconds. Some of such devices do not need to have power applied to them continuously. There are instances when the actual power that is available to a device is not being used at all, i.e., the current flow to the device is zero.

It is particularly advantageous for providing dynamic power sharing to powered devices that have a battery. These types of devices can then be recharged when power is available and their operability is not compromised if they are not provided with power for some period of time.

Embodiments of the invention can preferably selectively enable and disable the time slicing capability on individual PoE ports, and can also control the frequency and/or duration of the time slicing to be compatible with the permitted down time requirement of particular powered devices that are connected to the ports. Such information can also be fed to the PoE controller for easier handling of power allocation.

The frequency of time slicing can be every minute or even a few seconds. As technology adopts PoE plus, the IEEE 803.at specification, there will be more power to be distributed, so that even laptops may be powered over the network. With the 803.at specification, the upper power limit may be as much as 30 to 60 Watts allowed per port.

Current systems have chassis and stackable switches, and the PoE microcontroller 28 preferably does all of the power management for the switches. Initial parameters must be given upon startup, such as port mapping parameters, the power available as well as the maximum allowed power for individual ports in the configuration, and then the controller 28 does all of the power management. The time slicing capability can be programmed into the microcontroller 28 or it can reside in the application software, and is part of the generic power management capability.

Other embodiments may implement a strategy where the primary management CPU 12 or the PoE microcontroller 28 can be set up to have manual power management, in which case application software running on the system would perform the power management in that such software would tell the microcontroller 28 to selectively power up or power down individual ports within the switch or do whatever power management that is required.

The time slicing operability is ultimately preferably carried out by the PoE microcontroller 28 but commands may originate with the application software. The user can enable or disable the time slicing feature with regard to individual ports, so the user can selectively employ time slicing if the device has an internal battery or can support some downtime before it became inoperable, or had to be reinitialized. The frequency of time slicing can be varied on a port by port basis.

Power calculations can be made in one of three ways. A first way is to use a class based priority 0-3 for 803.af and 0-4 for 803.at specifications. This class differentiation is shown in FIGS. 2 and 3. When the powered device is first detected, the class is specified by the user based upon the maximum power of the class. A second way is by a user specified priority which enables the user to enter some known wattage based upon the power requirements of the powered device on a particular port. A third way is to determine the actual usage of the powered devices for defining the power requirements. It may be a small power consuming device, for which one watt of power may be specified.

It should also be understood that the management module may turn off the device for a prolonged period until the network required its use, rather than time slicing on a scheduled predetermined interval. Alternatively, the management module could simply be controlled to reduce the voltage on the port to be powered down. For example, it may be possible to provide a low voltage trickle charge for predetermined circuits or batteries in a phone. Then when a demand for service is made, such as when the goes off-hook, the drop in line resistance can be sensed and the voltage is reasserted at a high level for normal service.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A network switch for use in a local area network that interconnects the network switch and one or more network powered devices, the network switch being operatively connected to at least one power supply that powers the network switch, the network switch comprising:
   a plurality of ports to which the one or more network powered devices are connected;
   a management module to distribute power from the at least one power supply to the plurality of ports, said management module having a memory for storing information relating to each of the one or more network powered devices, said information indicating whether power to a network powered device is to be temporarily interrupted during normal operations;
   a processor to control the management module,
   wherein the management module is further to interrupt the power provided to a selected one of said plurality of ports by reducing the power provided to the selected port to a trickle charge, based on said information indicating that the power to a corresponding network powered device connected to the selected port is to be temporarily interrupted during normal operations, and
   wherein, upon detection of a demand for power from the corresponding network powered device connected to the selected port, the management module is to increase the power provided to the selected port from the trickle charge to a level of normal operations.

2. A network switch as defined in claim 1, wherein said network switch is a Power over Ethernet switch.

3. A network switch as defined in claim 1, wherein said processor is to selectively enable and disable time slicing of power on the plurality of ports on a port by port basis.

4. A network switch as defined in claim 1, wherein at least one of the network powered devices has an internal battery.

5. A network switch as defined in claim 1, wherein the network powered devices comprise one or more selected from the group consisting of access points, Internet Protocol (IP) telephones and IP cameras.

6. A network switch as defined in claim 1, wherein said management module is to interrupt the power to the selected port at a predetermined frequency.

7. A network switch as defined in claim 6, wherein said predetermined frequency is within a range of 1 second and several minutes.

8. A network switch as defined in claim 6, wherein said processor is programmable to specify said predetermined frequency.

9. A network switch as defined in claim 1, wherein the network powered device connected to the selected port has normal periods of downtime and is operable within an acceptable time after power is reapplied thereto.

10. A network switch as defined in claim 1, wherein said network switch has at least one associated power supply for providing power to said network switch and wherein said management module is programmable to control the power being applied to all of the ports of the network switch based upon a capacity of said at least one associated power supply, and the existence of and the amount of power being allocated to each of said ports being based upon at least one of the following considerations:

the priority of the network powered device connected to the port;

the classification of the network powered device connected to the port, wherein the classification specifies the maximum power of the class;

a user specified maximum power for the network powered device connected to the port; and the actual usage of power by the network powered device.

11. The network switch as defined in claim 1, wherein the trickle charge is for charging a battery in the corresponding network device.

12. The network switch as defined in claim 1, wherein the detection of the demand for power from the corresponding network powered device connected to the selected port comprises detection of a drop in line resistance indicating activation of the corresponding networked powered device.

13. A network switch for use in a local area network, the network switch being operatively connected to a power supply that powers the network switch, the network switch comprising:

a plurality of ports to be connected to network devices;

a management module to distribute power from the power supply to the plurality of ports;

a memory for storing information relating to each of the connected network devices, said information indicating whether power to a network device is to be periodically interrupted during normal operations; and at least one processor to control the management module, wherein the management module is to reduce the power provided to a selected one of the plurality of ports to a trickle charge based on the information stored in the memory indicating that the power to a corresponding network device connected to the selected port is to be periodically interrupted during normal operations, and wherein, upon detection of a demand for power from the corresponding network device connected to the selected port, the management module is to increase the power provided to the selected port from the trickle charge to a level of normal operations.

14. A network switch as defined in claim 13, wherein said management module is to periodically interrupt the power to selected ports connected to network devices that have predetermined allowed downtime.

15. A network switch as defined in claim 13, wherein the network devices comprise one or more selected from the group consisting of access points, Internet Protocol (IP) telephones and IP cameras.

16. A method of distributing DC power to a plurality of ports in a network switch, wherein the plurality of ports are connected to network devices, the network switch having a management module with processing and memory capability for controlling power delivered to the plurality of ports based upon operational requirements of the network devices connected to the ports, said method comprising:

dynamically allocating power among the plurality of ports by reducing power provided to a selected one of the plurality of ports to a trickle charge, based in part upon the operating requirements of a corresponding network device connected to the selected port;

detecting a demand for power from the corresponding network device connected to the selected port; and upon detecting the demand for power from the corresponding network device connected to the selected port, increasing the power provided to the selected port from the trickle charge to a level of normal operations.

17. A method as defined in claim 16, wherein said operating requirements include the ability of the network devices to operate normally even though power is intermittently applied thereto.

18. A method as defined in claim 17, wherein the network devices have either internal batteries or operate with periods of downtime.

19. A method as defined in 16, further comprising receiving user input dictating whether a particular port is continuously or intermittently provided with power for a network device.

* * * * *